A. W. BURKE.
TOOL FOR SLOTTING COMMUTATORS.
APPLICATION FILED APR. 2, 1910.
1,048,939.
Patented Dec. 31, 1912.
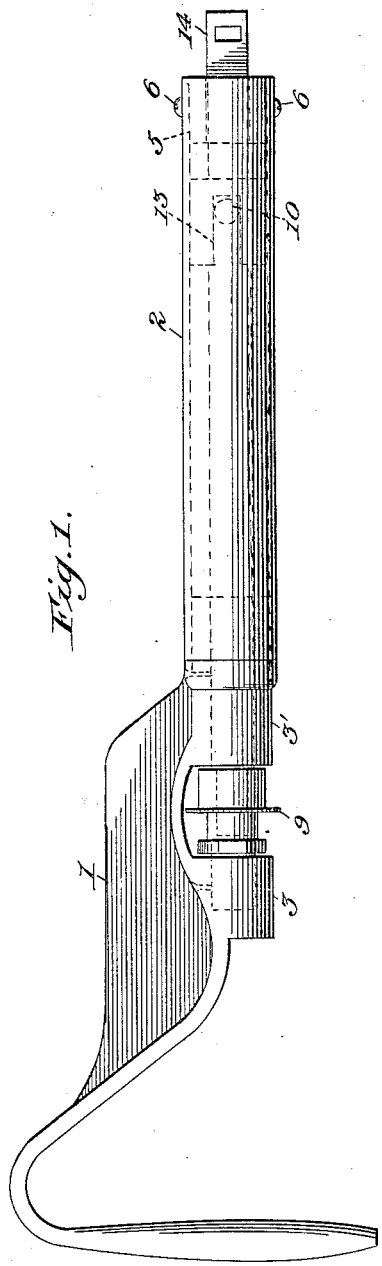
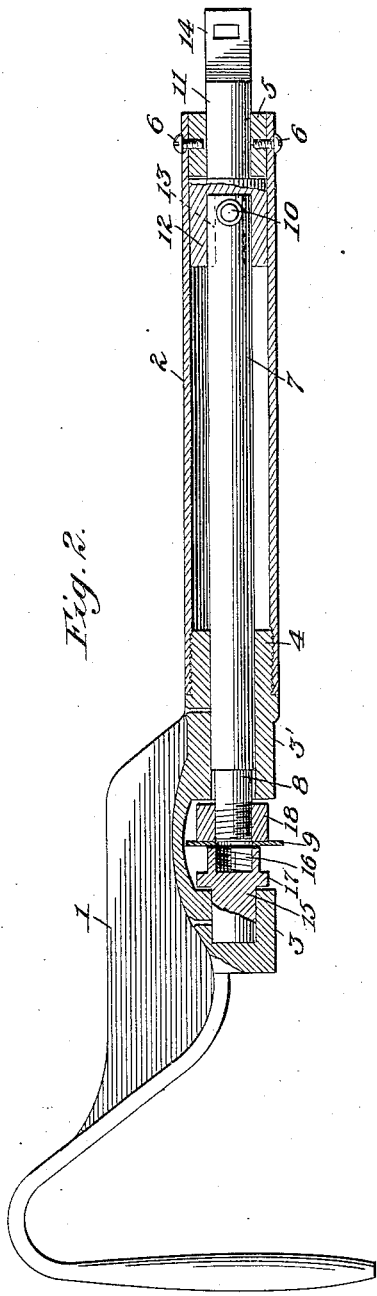
Witnesses:
C. H. Potter.
N. P. Leonard.
Inventor
Alfred W. Burke
by Byrnes, Townsend & Pickerstin
Attys

UNITED STATES PATENT OFFICE.

ALFRED W. BURKE, OF PITTSBURGH, PENNSYLVANIA.

TOOL FOR SLOTTING COMMUTATORS.

1,048,939.      Specification of Letters Patent.      Patented Dec. 31, 1912.

Application filed April 2, 1910. Serial No. 553,082.

*To all whom it may concern:*

Be it known that I, ALFRED W. BURKE, a subject of the King of Great Britain, residing at Pittsburgh, in the county of Allegheny and State of Pennsylvania, have invented certain new and useful Improvements in Tools for Slotting Commutators, of which the following is a specification.

This tool is designed to uniformly cut out portions of the mica segments employed in the commutators of electric dynamos and motors.

The tool comprises a support having portions adapted to bear on the commutator, and a saw carried and driven by a shaft journaled in the support and of such diameter as to groove away the mica segments to the desired depth.

Referring to the accompanying drawing—Figure 1 is a side elevation of the tool, and Fig. 2 is a similar view with parts in vertical axial section.

The tool illustrated has a support comprising a handled member 1 and a tube 2. The member 1 is preferably a bronze casting, having journal-bearing portions 3, 3' with rounded lower faces to rest on the commutator at each side of the mica segment to be cut away, and a cylindrical externally-threaded end-piece 4, upon which is secured one end of the tube 2. In the other end of the tube is a bearing 5, held in place by set-screws 6. A shaft 7 is journaled in the bearing 3', having at one end a threaded extension 8 of decreased diameter, to receive the saw 9, and at its other end a transverse pin 10, the ends of which project and are slightly reduced. Journaled in the bearing 5 is a spindle 11 having a large head 12 which is adapted to rotate and reciprocate in the tube 2. This head is bored to receive and act as a bearing for the adjacent end of the shaft 7 and has a transverse slot 13 to receive the ends of the pin 10. The spindle has an apertured outer end 14, adapted to be connected to a flexible driving shaft.

Journaled in the bearing 3 is a revoluble member 15, having a threaded bore 16 to receive the threaded end 8 of the shaft 7, and a hexagonal projection 17 to receive a wrench. A ring 18 slides loosely on the shaft-end 8 and serves to clamp the saw 9 against the member 15 when the latter is held by a wrench and the end of the shaft is screwed firmly into its bore 16. As the shaft is thus screwed in, it slides endwise in the bearing 3' and its pin 10 slides in the slot 13 of spindle-head 12. When the parts of the tool are assembled, the head 12 is normally at some little distance from the bearing 5. This permits the tool and saw, when driven by a non-extensible flexible shaft, to be moved transversely to the axis of shaft 7, the saw moving in a right line and thus following the straight mica segment, the head 12 of the spindle 11 sliding in the tube 2 and on the shaft 7 and pin 10 as the tool is shifted and takes different positions relative to the flexible shaft. To remove the saw, a wrench is placed on the hexagonal piece 17 and the shaft 7 is then rotated to unscrew it by rotating the flexible shaft, allowing the saw to drop from between the clamping members 15 and 18.

I claim:—

1. A tool for slotting commutators, comprising a handle and support adapted to rest on the commutator, a shaft journaled in the support and carrying a saw, and shaft-driving means journaled in the support, receiving and centering the adjacent end of the shaft, and movable longitudinally with reference to the support and shaft.

2. A tool for slotting commutators, comprising a handle and support adapted to rest on the commutator, a shaft and a driving-spindle journaled in the support, one end of said shaft carrying a saw, and an extensible connection between said shaft and spindle, supporting the other end of the shaft.

3. A tool for slotting commutators, comprising a handle and support adapted to rest on the commutator, a shaft journaled in the support, said shaft having a threaded end carrying a saw, and a revoluble member journaled in the support, receiving the threaded shaft-end and bearing against the saw.

4. A tool for slotting commutators, comprising a handle and support adapted to rest on the commutator, a shaft and a driving-spindle journaled in the support, an extensible connection between said shaft and spindle, said shaft having a threaded end carrying a saw, and a revoluble piece journaled in the support, receiving the threaded shaft-end and bearing against the saw.

5. A tool for slotting commutators, comprising a handle and support adapted to rest on the commutator, a saw-shaft having one end journaled in said support, and a revoluble member journaled in said support and longitudinally movable to engage the other end of said shaft.

6. A tool for slotting commutators, comprising a handle and support adapted to rest on the commutator, a saw-shaft having one end journaled in said support, and a revoluble member journaled in said support and longitudinally movable to engage the other end of said shaft, said support including a fixed casing within which such shaft revolves.

In testimony whereof, I affix my signature in presence of two witnesses.

ALFRED W. BURKE.

Witnesses:
EUGENE A. BYRNES,
CHARLES H. POTTER.